United States Patent
Page et al.

(10) Patent No.: US 10,494,272 B2
(45) Date of Patent: Dec. 3, 2019

(54) SELF-REGENERATING BIOFILTER

(71) Applicant: United States of America as Represented by The Secretary of the Army, Alexandria, VA (US)

(72) Inventors: Martin Page, Urbana, IL (US); Andrew J. Nelson, Champaign, IL (US); Benjamin C. Masters, Urbana, IL (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 15/942,438

(22) Filed: Mar. 31, 2018

(65) Prior Publication Data

US 2019/0047876 A1 Feb. 14, 2019

Related U.S. Application Data

(62) Division of application No. 14/870,824, filed on Sep. 30, 2015, now abandoned.

(51) Int. Cl.
| | |
|---|---|
| *C02F 1/28* | (2006.01) |
| *C02F 3/06* | (2006.01) |
| *C02F 3/00* | (2006.01) |
| *C02F 3/10* | (2006.01) |
| *C02F 1/42* | (2006.01) |

(52) U.S. Cl.
CPC ............... *C02F 1/283* (2013.01); *C02F 1/42* (2013.01); *C02F 3/006* (2013.01); *C02F 3/06* (2013.01); *C02F 3/104* (2013.01); *C02F 3/106* (2013.01); *B01D 2101/02* (2013.01); *C02F 2003/001* (2013.01); *C02F 2209/006* (2013.01); *C02F 2209/02* (2013.01); *C02F 2209/44* (2013.01); *C02F 2303/16* (2013.01); *Y02W 10/15* (2015.05)

(58) Field of Classification Search
CPC . B01D 2101/02; B01D 2101/04; C02F 1/283; C02F 1/42; C02F 2003/001; C02F 2209/006; C02F 2209/02; C02F 2209/44; C02F 2303/16; C02F 3/006; C02F 3/06; C02F 3/104; C02F 3/106; Y02W 10/15
USPC .......................................................... 210/618
See application file for complete search history.

(56) References Cited

U.S. PATENT DOCUMENTS

| | | | | |
|---|---|---|---|---|
| 3,717,251 A * | 2/1973 | Hampton | ............. | B01D 24/008 210/741 |
| 4,342,649 A * | 8/1982 | Hughes | ................ | B01D 24/165 210/108 |
| 2010/0176044 A1* | 7/2010 | Domb | .................. | B01J 20/0229 210/205 |

\* cited by examiner

*Primary Examiner* — Claire A Norris
(74) *Attorney, Agent, or Firm* — Brian C. Jones

(57) ABSTRACT

The present invention is a self-regenerating biofilter. The biofilter tank receives untreated water through an intake inlet, filters it through a filtration mass and expels purified water through an output outlet. The filtration mass includes gravel and activated carbon layers separated by a mesh screen. A compressed air line is located below the mesh screen. Periodically, the biofilter self-cleans by opening a flush valve that expels a flush water stream carrying debris. The biofilter self-regenerates by periodically stopping filtration for a time, allowing biological matter left on the activated carbon to degrade into biomass. Periodically, the biofilter removes and flushes out biomass by application of water or a combination of air and water.

7 Claims, 4 Drawing Sheets

SELF-REGENERATING BIOFILTER

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

BACKGROUND OF THE INVENTION

1. Field of Invention

This invention relates to the field of liquid purification or separation and more specifically to a particulate material type separator with rehabilitation means.

2. Description of Related Art

Aerobic water treatment systems utilize oxygen and microbes to degrade organic matter and neutralize contaminants, allowing reuse of the water. Typically, aerobic treatment is a two-step process. The first phase is physical filtration of larger particles, which aggregate into a separate biomass. Microbes then degrade the remaining organic matter until it is stable and/or less hazardous.

Fixed-media biological filtration methods rely on either trickling water over media or submerging the media in water. Trickling methods involve continual trickling of water over large filtration media or intermittent trickling of water over large media. Submersion methods rely on continuous operation of a fully submerged filter or other media, which is periodically removed for cleaning or replacement to retain its absorptive capacity.

Several problems are known in the art with respect to both trickling and submersion methods. First, both methods require substantial down time to change filtration media and/or remove the solid biomass from the system. Both methods also require substantial energy to maintain continuous trickling of water or flow through submerged media.

There is an unmet need in the art for a biofilter capable of biological regeneration in place (self-cleaning) in a manner that allows it to restore its adsorptive capacity There is a further unmet need in the art for a biofilter that can facilitate more efficient control of the temperature at which biological treatment occurs.

BRIEF SUMMARY OF THE INVENTION

In one embodiment of the present invention, a self-regenerating biofilter apparatus includes a biofilter tank, a filtration mass and a compressed air line. The biofilter tank includes an intake inlet connected to a first channel and receiving an untreated water stream. The biofilter tank also includes an output outlet connected to a second channel and expelling a purified water stream. The biofilter tank also includes a flush valve expelling a flush water stream. The filtration mass includes a layer of gravel and a layer of non-gravel materials. The layer of non-gravel material includes activated carbon. The filtration mass is located within the biofilter tank and at least partially above the intake inlet and the flush valve. A mesh screen separates the layer of gravel from the layer of non-gravel material. The compressed air line is located at least partially within the biofilter tank below the mesh screen.

In another embodiment of the present invention, a self-regenerating biofilter system includes at least one self-regenerating biofilter apparatus, as above, and a central controller connected to the flush valve and connected to a power source.

In another embodiment of the present invention, a method for using a self-regenerating biofilter apparatus, as above, includes iteratively invoking a function n times. The function includes the steps of: receiving an untreated water stream into a biofilter tank through an intake inlet; filtering the untreated water stream through the filtration mass to transform the untreated water stream into the purified water stream; expelling the purified water stream through the output outlet connected to the second channel; stopping receiving the untreated water stream; opening the flush valve; draining the flush water stream through the flush valve; closing the flush valve and waiting for a predetermined time period before invoking another iteration of the function. The method also includes the steps of receiving the untreated water stream into the biofilter tank through the intake inlet, opening the flush valve, draining the flush water stream through the flush valve and closing the flush valve.

BRIEF DESCRIPTION OF SEVERAL VIEWS OF THE DRAWING(S)

TERMS OF ART

As used herein, the term "channel" means a structure used to convey fluids.

As used herein, the term "ion exchange media" means media that can exchange ions with a solution of electrolytes.

As used herein, the term "mesh" means a material having apertures.

As used herein, the term "mesh size" means the number of apertures per square inch in a mesh through which a particle can pass. The higher number a mesh size has, the smaller a particle must be to pass through the mesh.

DETAILED DESCRIPTION OF THE INVENTION

Figure 1:
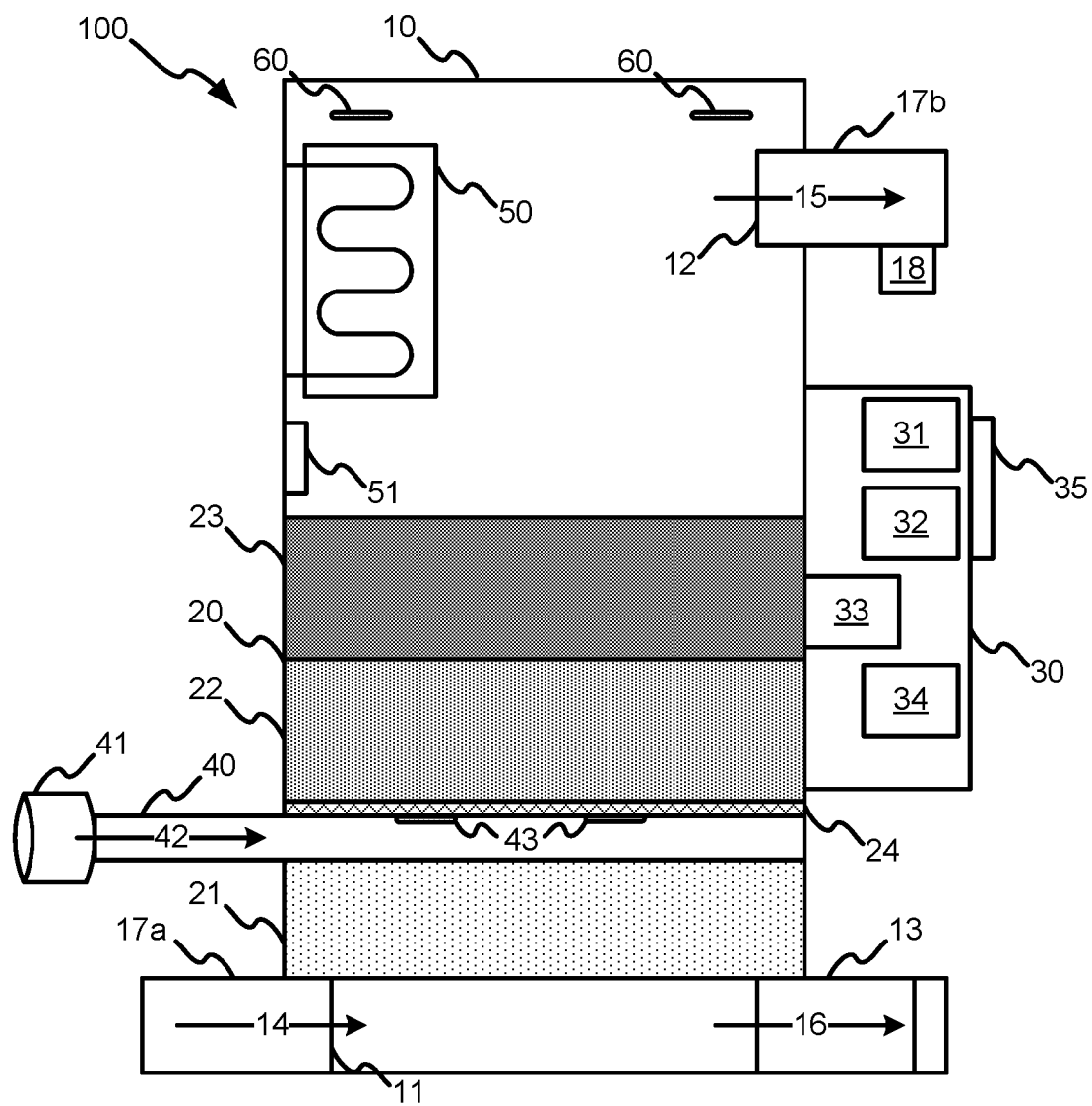
FIG. 1 illustrates a side view of an exemplary embodiment of a self-regenerating biofilter.

FIG. 1 illustrates a side view of an exemplary embodiment of a self-regenerating biofilter 100. Self-regenerating biofilter 100 includes a biofilter tank 10, a filtration mass 20, an optional controller 30, a compressed air line 40, an optional heating element 50, and at least one vent 60.

Biofilter tank 10 houses filtration mass 20, compressed air line 40 and heating element 50. Biofilter tank 10 has a volume ranging from approximately 5 gallons to approximately 5,000 gallons, with a daily flow-through volume ranging from approximately 50 gallons to approximately 50,000 gallons. Intake inlet 11 provides influent of an untreated water stream 14, while output outlet 12 removes a purified water stream 15. Intake inlet 11 is located on a level below filtration mass 20 to ensure capture of large particulates below filtration mass 20.

Flush valve 13 permits draining of biofilter tank 10 to allow air to enter filtration mass 20 to aid microorganisms in breaking down any biodegradable contaminants adsorbed from untreated water stream 14 and turn them into biomass. In the exemplary embodiment, flush valve 13 is a solenoid valve. In other embodiments, flush valve 13 is a pinch valve, solenoid valve, or ball valve. In various embodiments, operation of flush valve 13 may occur automatically or manually.

The capture of large particulate occurring on a level below filtration mass 20 permits easily removal of the same large particulates in a flush water stream 16 traveling through flush valve 13. At least one of biofilter tank 10 and the channels 17a and 17b connected to intake inlet 11 and output outlet 12, respectively, includes at least one vent 60 for pressure equalization. Optionally, at least one of intake inlet 11, output outlet 12, channel 17a or channel 17b includes a flow meter sensor 18 to measure flow volume of untreated water stream 14 or purified water stream 15.

Filtration mass 20 removes water contaminants by straining, adsorption and/or biological remediation. Biodegradable contaminants in untreated water stream 14 provide food for microorganisms in filtration mass 20 and become biomass. Filtration mass 20 adsorbs these contaminants, which has an impact on filtration mass 20.

Filtration mass 20 is made up of separate layers of gravel 21 and non-gravel material. In the exemplary embodiment, non-gravel material is activated carbon 22 and optional ion exchange material 23. Gravel 21 is crushed rock having an average diameter ranging from approximately 5 mm to approximately 30 mm. Activated carbon 22 is granular activated carbon having a mesh size ranging from approximately 8 to approximately 12. Ion exchange material 23 also has a mesh size ranging from approximately 8 to approximately 12.

In the exemplary embodiment, ion exchange material 23 is zeolite. In other embodiments, ion exchange material 23 is a synthetic material specifically selected to target a particular contaminant of interest that can be biodegraded or bioaccumulated. By way of non-limiting example, in one embodiment, ion exchange material 23 is a tannin anion resin targeting humic acids and tannins. Certain embodiments may use multiple different ion exchange materials 23 to target multiple contaminants of interest.

In certain embodiments, at least one of activated carbon 22 and ion exchange material 23 includes a bioculture seed. Bioculture seeds may include custom cultures generated for the particulate contaminant stream of interest by mixing an environmental source (i.e., soil, sludge) with a growth media containing nutrients and the desired target contaminants. Bioculture seeds may include commercial aerobic cultures such as those used for the aquarium industry, or pure cultures of microbes with desired physiological attributes for the desired biodegradation process or environment.

A mesh screen 24 separates gravel 21 from activated carbon 22 and ion exchange material 23. In the exemplary embodiment, filtration mass 20 makes up approximately 50% to approximately 85% of the volume of biofilter tank 10. Gravel 21 makes up approximately 3% to approximately 10% of filtration mass 20. Activated carbon 22 makes up approximately 60% to approximately 97% of filtration mass 20. Ion exchange material 23 makes up to approximately 30% of filtration mass 20.

In the exemplary embodiment, self-regenerating biofilter 100 includes controller 30. Controller 30 connects to flush valve 13, allowing it to control when self-regenerating biofilter 100 drains and regenerates. In the exemplary embodiment, controller 30 includes a timer 31, a memory 32, a biomass sensor 33, at least one power source 34 and a controller interface 35. Timer 31 allows flush valve 13 to open and close according to a pre-programmed cycle, which may be located in memory 32. The duty cycle for flush valve 13 may range from approximately 10% to approximately 90%, depending on the contaminant loading rate on a given volume and geometry of filter mass 20 and the adsorptive capacity of filter mass 20 for the contaminant. In the exemplary embodiment, flush valve 13 has an approximately 50% duty cycle, open for approximately four hours and closed for approximately four hours, allowing degradation of biodegradable contaminants on activated carbon 22 and ion exchange material 23.

Biomass sensor 33 provides a user or controller 30 with information about the level of biomass in self-regenerating biofilter 100. This allows automated or manual triggering of a biomass removal cycle when biomass in self-regenerating biofilter 100 has reached a critical level. In one embodiment, biomass sensor 33 senses a head differential across filter mass 20. In another embodiment, biomass sensor 33 senses UV light absorbance across filter mass 20. Power source 34 may be a DC or AC voltage source. Power source 34 couples to controller 30 and other parts of self-regenerating biofilter 100 that might require power. In certain embodiments, each part of self-regenerating biofilter 100 that might require power has a separate power source 34. Controller 30 optionally includes a controller interface 35, which may permit a user to enter commands to and receive output information from controller 30.

Compressed air line 40 is located just below mesh screen 24. An air source 41, such as, but not limited to an air compressor or compressed air cylinder, provides an air stream 42 through compressed air line 40. Controller 30 may connect to air source 41, allowing controller 30 to control the flow of air through compressed air line 40. During a biomass removal cycle, air stream 42 travels through compressed air line 40 and enters biofilter tank 10 through at least one air line aperture 43. Air stream 42 can also enter into filtration mass 20 after draining self-regenerating biofilter 100 to further increase oxygen concentrations. A resistive heater may pre-warm air stream 42 to increase the temperature of filtration mass 20 during regeneration.

Combined with an influx of untreated water stream 14 from intake inlet 11, air stream 42 fluidizes and tumbles activated carbon 22 and ion exchange material 23, removing biomass from activated carbon 22 and ion exchange material 23. In the exemplary embodiment, biomass removal occurs every two days. This frequency may increase for untreated water streams 14 having high amounts of biodegradable contaminants. The frequency of biomass removal may likewise decrease for untreated water streams 14 having low amounts of biodegradable contaminants. In certain embodiments, use of air stream 42 may not be necessary for untreated water streams 14 having low amounts of biodegradable contaminants.

In the exemplary embodiment, self-regenerating biofilter 100 includes heating element 50. Although self-regenerating biofilter 100 does not require heat in many environments, certain biological degradation processes may accelerate due to application of heat creating an optimal temperature for biodegradation rates and biomass production. Heating element 50 is located within biofilter tank 10 and couples to controller 30. A thermal sensor 51 coupled to controller 30 takes temperature readings to ensure that the temperature does not increase or decrease to undesired levels.

Figure 2:
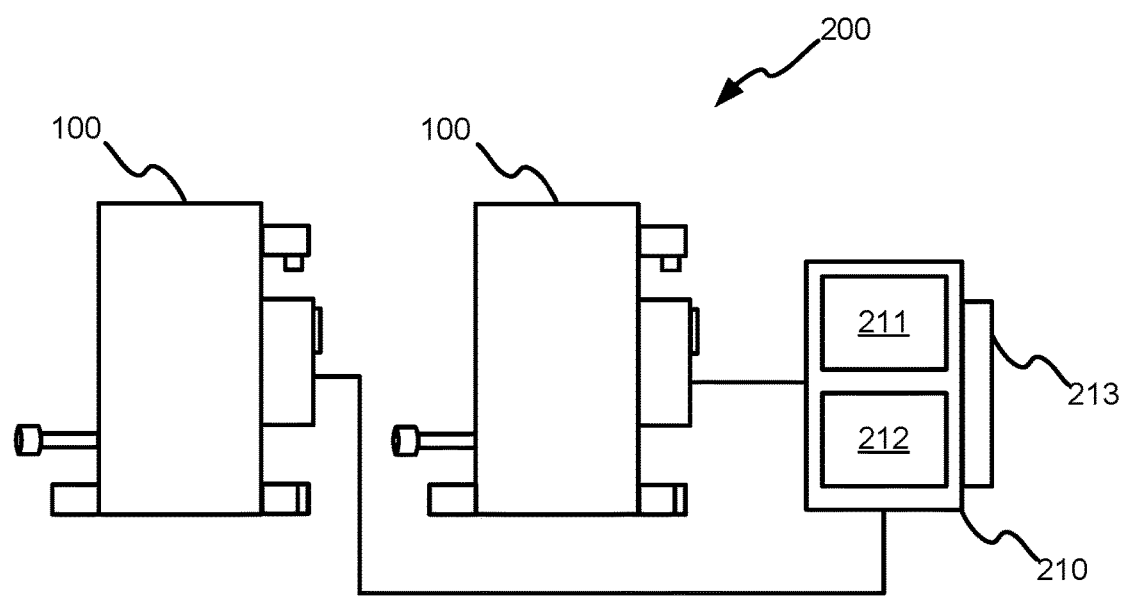
FIG. 2 illustrates an exemplary embodiment of a self-regenerating biofilter system.

FIG. 2 illustrates an exemplary embodiment of a self-regenerating biofilter system 200. Self-regenerating biofilter system 200 includes at least one self-regenerating biofilter 100 and a central controller 210. Self-regenerating biofilter system 200 is a scalable system. The exemplary embodiment shows a self-regenerating biofilter system 200 with a single self-regenerating biofilter 100 having a volume of 5 gallons, with a daily flow-through volume of approximately 50 gallons. Another embodiment incorporates twelve self-regenerating biofilters 100, each having a volume of 210 gallons. This self-regenerating biofilter system 200 has a daily flow-through volume of approximately thirty thousand gallons.

Central controller 210 connects to controller 30 and flush valve 13, allowing it to both send commands to controller 30 and override controller 30 to open flush valve 13. Certain embodiments of self-regenerating biofilter system 200 replace controller 30 with central controller 210. Central controller 210 may also directly connect to any sensors of self-regenerating biofilter 100, such as, but not limited to, flow meter sensor 18, biomass sensor 32 or thermal sensor 51.

Central controller 210 optionally includes a central timer 211, which allows flush valve 13 to open and close according to a pre-programmed cycle that may be stored in central memory 212. In embodiments incorporating multiple self-regenerating biofilters 100, central timer 211 allows coordination between self-regenerating biofilters 100. This ensures that at least one self-regenerating biofilter 100 is available for use at all times. This also allows self-regenerating biofilter system 200 to operate at peak capacity during peak gray water generation or demand times, such as, but not limited to, business hours in an office building or morning and evening in a residence, while reserving a smaller capacity for times when predicted demand is not as great. Central controller 210 optionally includes a central interface 213, which may permit a user to enter commands to and receive output information from central controller 210 and/or controller 30.

Figure 3A:
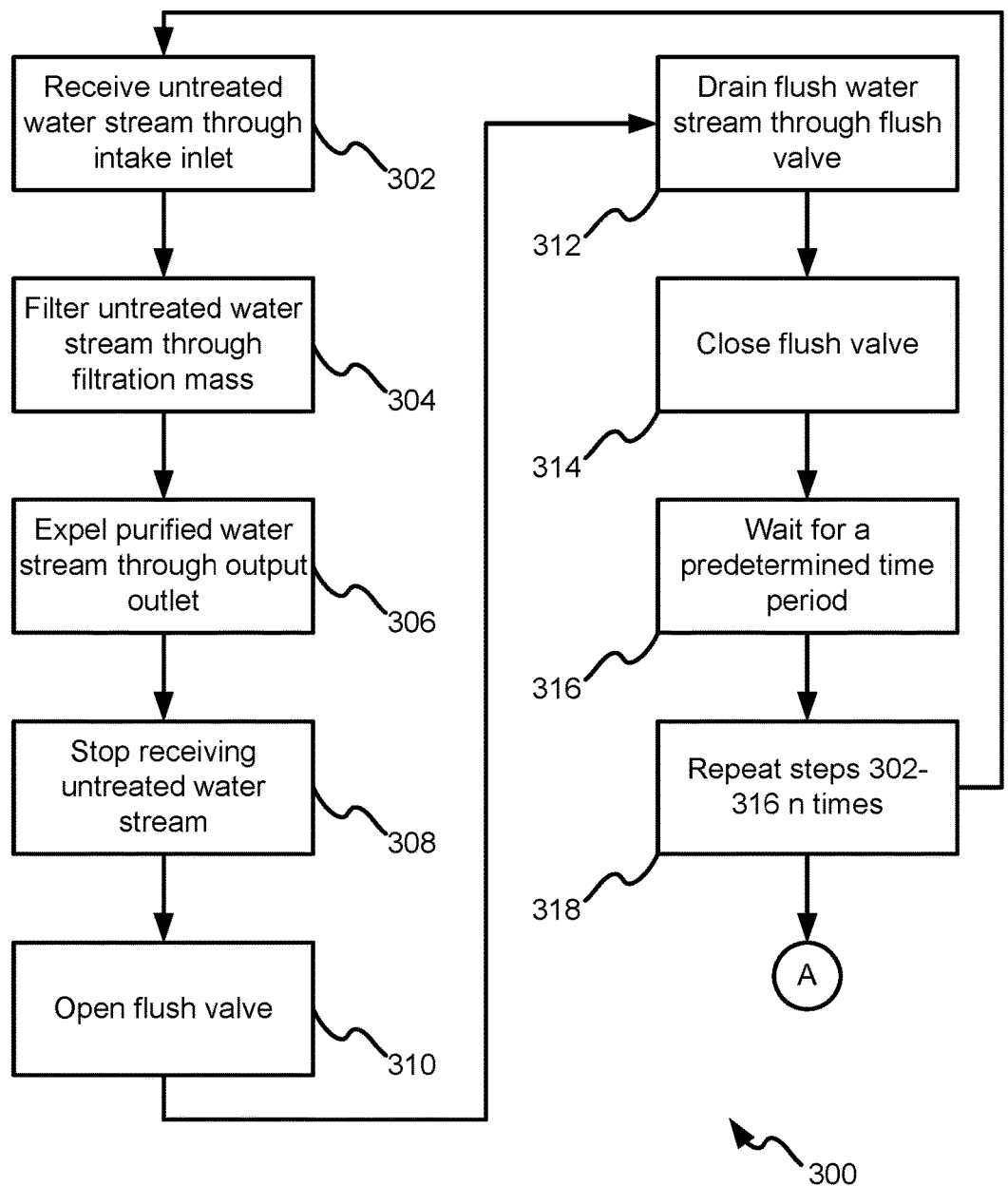
FIGS. 3a and 3b illustrate an exemplary embodiment of a method for using a self-regenerating biofilter.
Figure 3B:
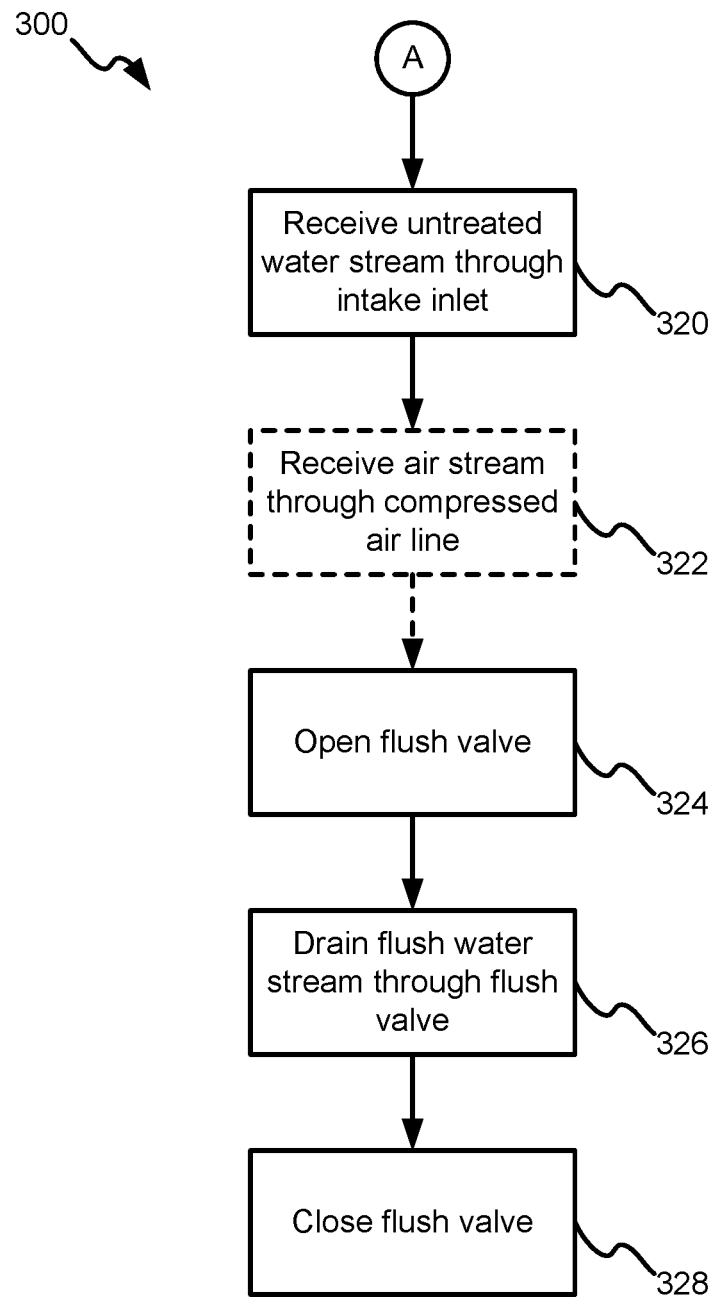

FIGS. 3a and 3b illustrate an exemplary embodiment of a method 300 for using self-regenerating biofilter 100.

In step 302, self-regenerating biofilter 100 receives an influx of untreated water stream 14 through intake inlet 11.

In step 304, self-regenerating biofilter 100 filters untreated water stream 14 through filtration mass 20, transforming it into purified water stream 15.

In step 306, self-regenerating biofilter 100 expels purified water stream 15 through output outlet 12.

In step 308, self-regenerating biofilter 100 stops receiving the influx of untreated water stream 14 through intake inlet 11.

In step 310, self-regenerating biofilter 100 opens flush valve 13.

In step 312, self-regenerating biofilter 100 drains flush water stream 16 through flush valve 13.

In step 314, self-regenerating biofilter 100 closes flush valve 13.

In step 316, self-regenerating biofilter 100 waits for a predetermined time period before continuing method 300.

In step 318, method 300 repeats steps 302-316 n times, until method 300 meets a preselected condition. This condition may be for elapsed time, volume of water treated or amount of biomass in self-regenerating biofilter 100.

In step 320, self-regenerating biofilter 100 receives an influx of untreated water stream 14 through intake inlet 11.

In optional step 322, self-regenerating biofilter 100 receives air stream 42 through compressed air line 40. Steps 318 and 320 may be performed simultaneously.

In step 324, self-regenerating biofilter 100 opens flush valve 13.

In step 326, self-regenerating biofilter 100 drains flush water stream 16 through flush valve 13.

In step 328, self-regenerating biofilter 100 closes flush valve 13.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "substantially" or "approximately" as used herein may be applied to modify any quantitative representation that could permissibly vary without resulting in a change in the basic function to which it is related.

What is claimed is:

1. A method for using a self-regenerating biofilter apparatus to purify water containing contaminants, said method comprising the steps of:
    receiving an untreated water stream into a biofilter tank through an intake inlet,
    filtering said untreated water stream through a filtration mass to transform said untreated water stream into a purified water stream, wherein said filtration mass removes water contaminants by straining/screening, adsorption and biological remediation,
    expelling the purified water stream through an output outlet;
    periodically stopping filtration for a time by stopping receiving the untreated water stream; opening a flush valve in accordance with a duty cycle from approximately 10% to approximately 90%; draining a water stream through the flush valve; closing the flush valve wherein biodegradable contaminants in said untreated water stream provide food for microorganisms in said filtration mass and are degraded and turn said biodegradable contaminants into biomass during said duty cycle controlled time period, and
    periodically performing a biomass removal wherein said self-regenerating biofilter receives a flush stream through said intake inlet, opening said flush valve, and draining a biomass debris containing flush water stream through said flush valve.

2. The method according to claim 1 wherein said filtration mass comprises a layer of gravel and a layer of non-gravel materials, wherein said layer of non-gravel material comprises activated carbon, wherein said filtration mass is located within said biofilter tank and at least partially above said intake inlet and said flush valve, wherein a mesh screen separates said layer of gravel from said layer of non-gravel material.

3. The method of claim 1, further comprising the step of receiving an air stream through a compressed air line.

4. The method of claim 1 wherein said filtration mass makes up approximately 50% to approximately 85% of a volume of said biofilter tank, wherein said layer of gravel comprises approximately 3% to approximately 10% of said filtration mass, wherein said layer of activated carbon comprises approximately 60% to approximately 97% of said filtration mass.

5. The method of claim 1 wherein said biofilter tank has a volume ranging from approximately 5 gallons to approximately 5,000) gallons, and wherein said biofilter tank has a daily flow-through volume ranging from approximately 50 gallons to approximately 50.000 gallons.

6. The method of claim 4 wherein said layer of gravel has an average diameter ranging from approximately 5 mm to approximately 30 mm, wherein said layer of non-gravel material has a mesh size ranging from approximately 8 to approximately 12.

7. The method of claim 4 wherein said filtration mass further comprises a layer of ion exchange material, wherein said layer of ion exchange material comprises up to approximately 30% of said filtration mass.

\* \* \* \* \*